(12) United States Patent
Takahashi

(10) Patent No.: US 6,328,406 B1
(45) Date of Patent: Dec. 11, 2001

(54) IMAGE RECORDING METHOD

(75) Inventor: Hiromitsu Takahashi, Iwate-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/627,930

(22) Filed: Jul. 28, 2000

(30) Foreign Application Priority Data

Jul. 30, 1999 (JP) .................................. 11-217569

(51) Int. Cl.$^7$ ............................. B41J 2/205; B41J 2/145; B41J 2/15
(52) U.S. Cl. .................................. 347/15; 358/1.9; 347/41
(58) Field of Search .................................. 347/15, 41, 40; 358/1.9, 1.17

(56) References Cited

U.S. PATENT DOCUMENTS 5,480,240 * 1/1996 Bolash et al. .................................. 400/124.01
6,154,233 * 11/2000 Breswick .................................. 347/40
6,249,272 * 6/2001 Yagi et al. .................................. 345/138

FOREIGN PATENT DOCUMENTS 6-8523    1/1994  (JP) .
6-270453  9/1994  (JP) .

* cited by examiner

Primary Examiner—Thinh Nguyen
(74) Attorney, Agent, or Firm—Brinks Hofer Gilson & Lione

(57) ABSTRACT

Disclosed herein is an image recording method capable of greatly increasing a record data processing speed and thereby performing high-speed recording. According to the image recording method, a process for successively examining dots in a raster direction, adding continuous flags to the dots when record data exists in the dots, and distributing record data for continuous dots supplied with the continuous flags to upper and lower bands when no record data exists in the dots. Further, record data for some dots in another raster direction are examined on the basis of record data for continuous dots in a raster direction, which are already subjected to a distributing process. When the examined record data are identical to the record data for the dots, the same distributing process as a process for distributing the continuous dots in the raster direction set as the reference is effected on record data for the continuous dots in another raster direction without condition.

5 Claims, 13 Drawing Sheets

(SOLID PATTERN PROCESS)

(RETURN PROCESS)

(REGULAR PATTERN PROCESS)

FIG. 7
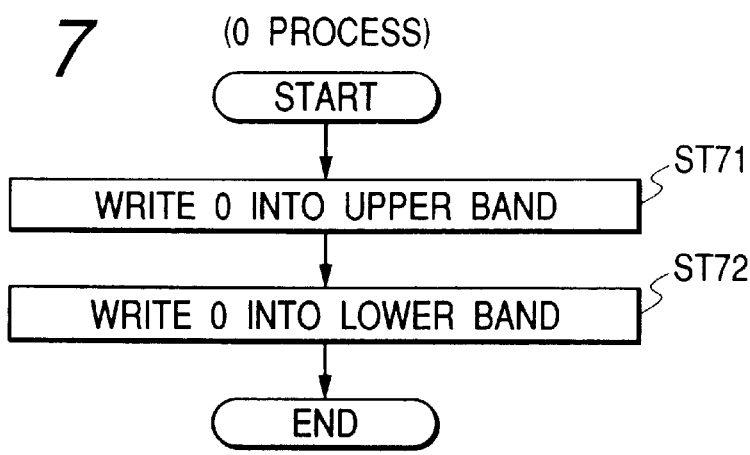
FIG. 8 { (0 PROCESS)  
0 PROCESS    UPPER BAND   ×  
                 LOWER BAND   ×
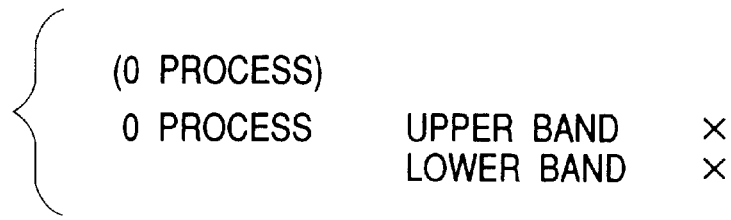
FIG. 9
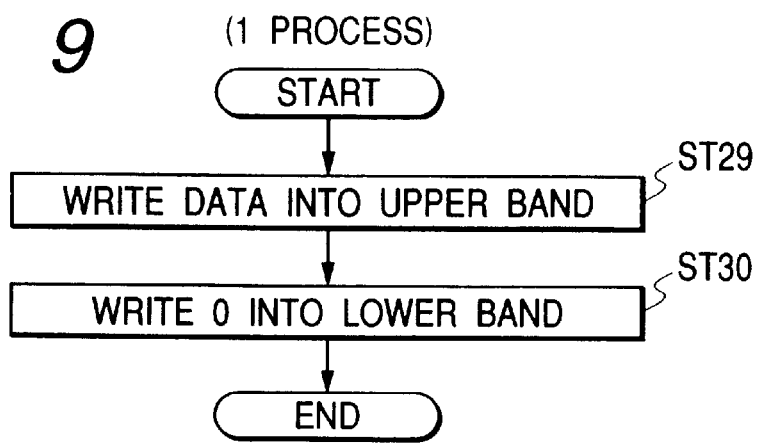
FIG. 10 { (1 PROCESS)  
1 PROCESS    UPPER BAND   ○  
                 LOWER BAND   ×
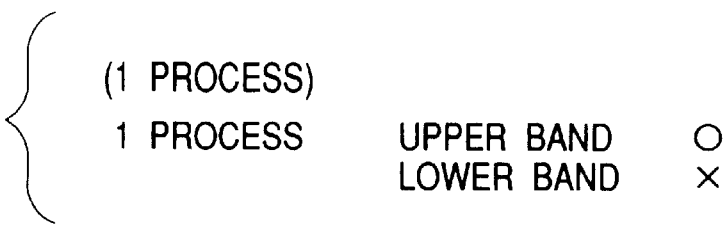

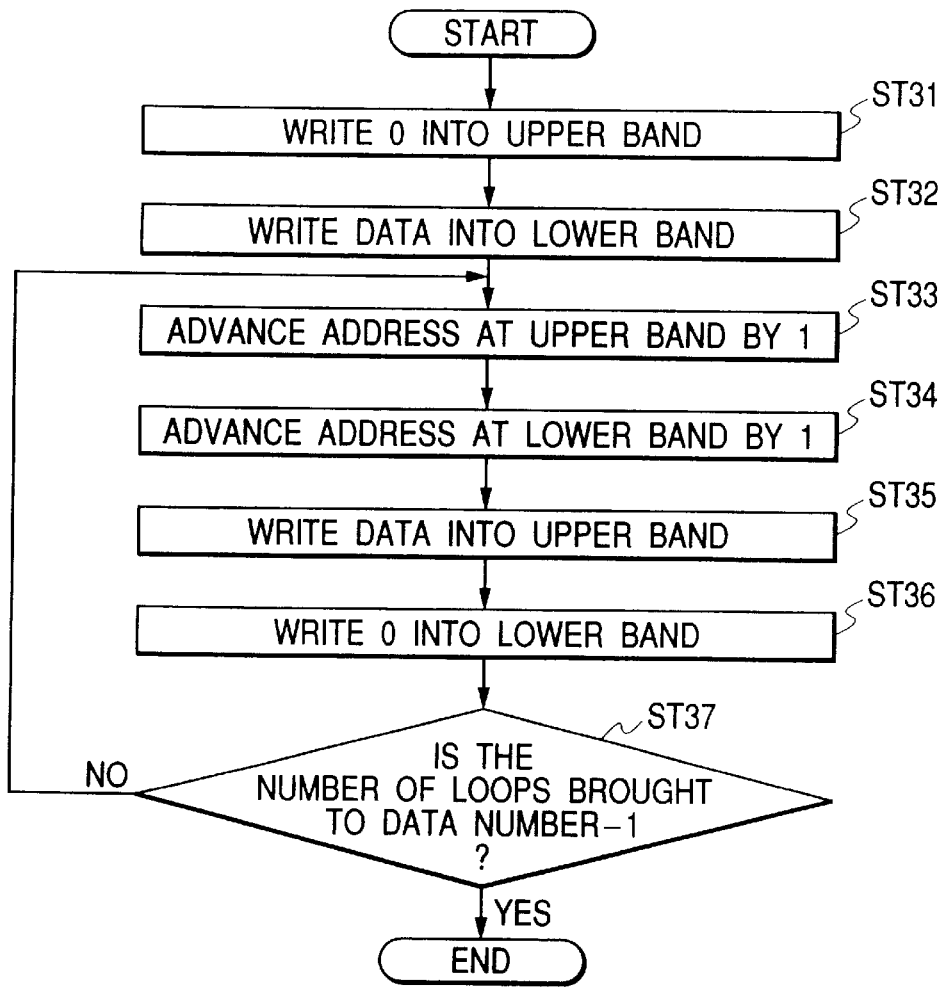

(6 TO 11 PROCESSES)

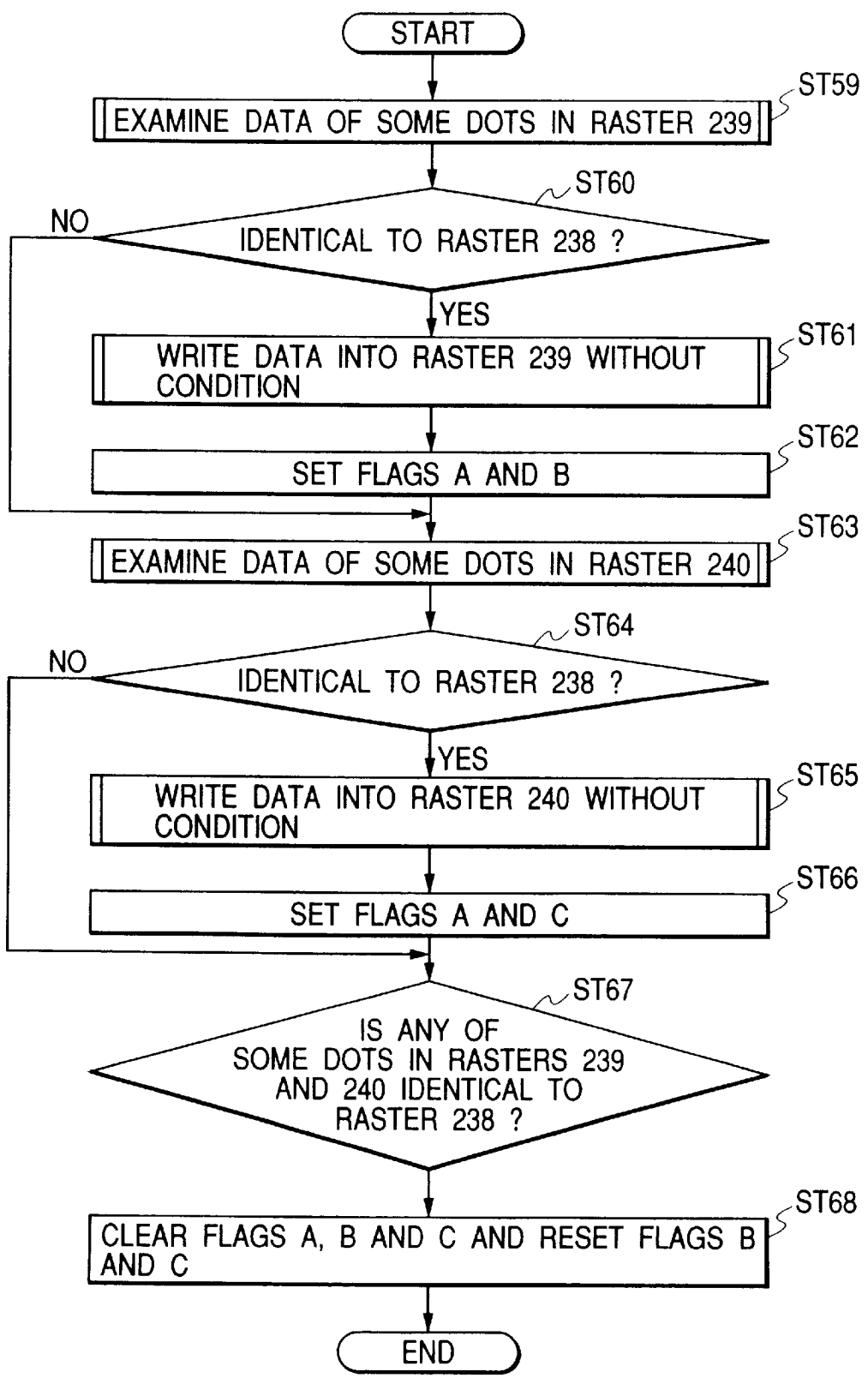

IMAGE RECORDING METHOD

BACKGROUND OF THE INVENTION

1. Field of the Invention

The present invention relates to an image recording method, and particularly to an image recording method of recording an upper band and a lower band of a thermal head so as to overlap each other and recording record data corresponding to a plurality of dots in such a superimposition recording range in the upper and lower bands in distributed form.

2. Description of the Related Art

In general, a thermal transfer printer is often used as an output device such as a computer, a word processor or the like due to reasons such as the quality of recording, low noise, low cost, ease of maintenance, etc.

In such a commonly-used thermal transfer printer, a sheet of paper is supported forward of a platen and a carriage is equipped with a thermal head with a plurality of heating or thermal elements formed thereon. While the thermal head is being moved forward and backward alternately along the platen together with the carriage in a state in which an ink ribbon is interposed between these thermal head and platen, the ink ribbon is unreeled and the heating elements of the thermal head are selectively energized based on record information to generate heat, whereby ink of the ink ribbon is partially transferred to the paper to record an image such as desired characters or the like onto the paper.

Further, such a thermal transfer printer is accompanied by a problem that a range recorded by one scanning of the thermal head and a range recorded by the next scanning of the thermal head excessively approach each other, thereby causing a so-called black line, and the ranges are separated from each other in reverse, thereby causing a so-called white line.

In order to prevent the occurrence of such black and white lines, the range (upper band) recorded by one scanning of the thermal head and the range (lower band) recorded by the next scanning of the thermal head have heretofore been recorded so as to overlap each other.

FIG. 20 schematically shows such a conventional recording method. When the number of heating or thermal dots for the thermal head is 240 dots, for example, four dots, i.e., a 237th dot, a 238th dot, a 239th dot and a 240th dot in the upper band, and a first dot, a second dot, a third dot and a fourth dot in the lower band are recorded so as to be superimposed on one another. Further, record data corresponding to the four dots are distributed to the upper and lower bands.

In such a case, the record data have heretofore been distributed to the upper and lower bands for each one column in a superimposition recording range (corresponding to four dots) while dots in the direction of the arrangement of the respective heating elements of the thermal head (in a column direction) are being examined. Namely, when record data exist in all four dots in a first column as shown in FIG. 20, first and second two dots of the four dots are distributed to the upper band, and third and fourth two dots thereof are distributed to the lower band. In a second column, a first dot is distributed to the upper band, and third and fourth two dots are distributed to the lower band. Further, in a third column, a first dot is distributed to the upper band, and second and fourth two dots are distributed to the lower band.

Thus, the recording of data in the superimposition recording range has heretofore been carried out by suitably distributing the record data for the dots to the upper and lower bands for each column respectively and driving each individual heating element of the thermal head, based on these distributed record data.

However, the conventional thermal transfer printer is accompanied by a problem in that since the record data for the dots are distributed in each column, the quantity of record data to be processed is extremely large and a processing speed becomes slow. Therefore, when, for example, the time required to energize each heating element of the thermal head is controlled and the diameter of each recording dot is changed to thereby perform such recording as it is necessary to handle a large amount of record data as in the case of the execution of multi-tonal recording or the like, a problem arises in that the processing of record data becomes insufficient and a recording speed is reduced, thus making it impossible to perform high-speed recording.

SUMMARY OF THE INVENTION

The present invention has been made in view of the aforementioned points. It is therefore an object of the present invention to provide an image recording method capable of greatly increasing a record data processing speed and performing high-speed recording.

In order to achieve the above object, an image recording method according to the invention of the present application is characterized in that a process for successively examining dots in a raster direction corresponding to a scanning direction of a thermal head, adding continuous flags to the dots when record data exist in the dots, and distributing record data for continuous dots supplied with the continuous flags to upper and lower bands when the record data do not exist therein, is carried out, and record data for some dots in another raster direction are examined on the basis of record data for continuous dots in a raster direction, which are already subjected to a distributing process, and the same distributing process as a process for distributing the continuous dots in the raster direction set as the reference is effected on record data for the continuous dots in another raster direction without condition when the examined record data are identical to the record data for the dots in the raster direction set as the reference.

Owing to the adoption of such a method, since the process for adding the continuous flag to each of the dots lying in the scanning direction of the thermal head when the record data exists in the dot and distributing the record data for the continuous dots supplied with the continuous flags to the upper and lower bands only when no record data exists therein, is carried out, the record data distributing process is simplified in the way of performing its process, throughput or the quantity of data to be processed can be greatly reduced, and processing can be performed easily and promptly as compared with the case where the record data distributing processes are executed for each column as in the prior art.

Further, the record data for some dots in another raster direction are examined on the basis of the record data for the continuous dots in the direction of the raster already subjected to the distributing process. Thus, when each examined record data is identical to the record data for the dots in the raster direction set as the reference, the same distributing process as the process for distributing the continuous dots set as the reference is effected on the record data for the continuous dots in another raster direction without condition. It is therefore possible to reduce the quantity of record data to be subjected to a distributing process much more and perform an easy and prompt process.

The invention of the present application is further characterized in that some dots examined in another raster direction with respect to the raster direction set as the reference are set as two dots respectively corresponding to at least a final dot of the continuous dots set as the reference and dots adjacent thereto and judged as having no record data, which are determined in accordance with the regularity of a dither matrix for image information.

Owing to the adoption of such a method, a distributing process can be effected on continuous dots in a raster direction set as the reference by simply examining record data for minimum dots in another raster direction, thus making it possible to reduce the quality of record data to be processed.

Further, the invention of the present application is characterized in that the raster direction set as the reference, of the respective raster directions in the superimposed recording range is determined in consideration of whether a screen angle of the dither matrix is placed in a positive or negative direction, based on image information.

Owing to the adoption of such a method, a proper and prompt distributing process can be done according to the direction of the screen angle of the dither matrix.

Furthermore, the invention of the present application is characterized in that distributing processes are respectively effected on record data of respective colors, based on image information color-separated into at least three colors of cyan, magenta and yellow to thereby perform full-color recording.

Owing to the adoption of such a method, distributing processes are respectively effected on record data corresponding to the respective colors of cyan, magenta and yellow, thereby making it possible to properly record a full-color image by the three colors of cyan, magenta and yellow.

The invention of the present application is characterized in that a distributing process is effected on record data for monochrome image information to thereby perform monochrome recording.

Owing to the adoption of such a method, a monochrome image can be recorded properly by effecting a distributing process on monochrome record data.

A typical invention of the present application has been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying draw in which:

FIG. 7 is a flowchart showing a zero process shown in FIG. 6;

FIG. 8 is an explanatory view illustrating the result of distribution by the zero process shown in FIG. 7;

FIG. 9 is a flowchart showing a one process shown in FIG. 6;

FIG. 10 is an explanatory view depicting the result of distribution by the one process shown in FIG. 9;

FIG. 11 is a flowchart showing two to five processes shown in FIG. 6;

FIG. 12 is an explanatory view illustrating the result of distribution by the two to five processes;

FIG. 17 is a flowchart illustrating raster 239–240 processes shown in FIG. 6;

FIG. 18 is a view showing a dither pattern in which the resolution for one pixel is represented in the form of a dither matrix of 3×3+1 and a screen angle is set minus;

FIG. 19 is a view illustrating a dither pattern in which the resolution for one pixel is given in the form of a dither matrix of 3×3+1 and a screen angle is set plus.

DESCRIPTION OF THE PREFERRED EMBODIMENTS

A preferred embodiment of the present invention will hereinafter be described with reference to FIGS. 1 through 19.

Figure 1:
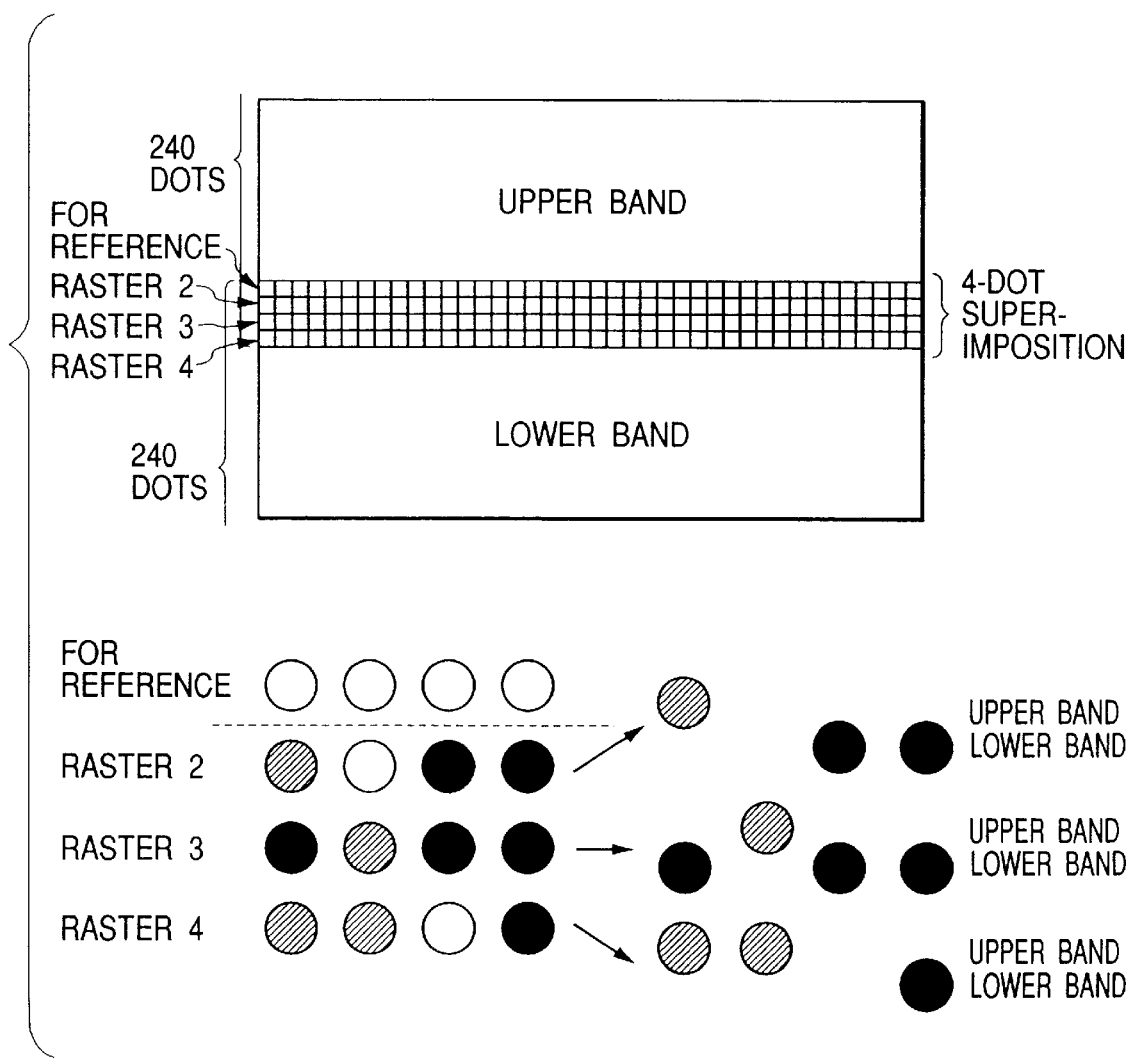
FIG. 1 is an explanatory view showing one embodiment of an image recording method according to the present invention.

FIGS. 1 through 19 show one embodiment of a color image forming method according to the present invention. In the present embodiment, a range (upper band) recorded by one scanning of a thermal head, and a range (lower band) recorded by the next scanning of the thermal head are recorded so as to overlap as shown in FIG. 1. When the number of heating or thermal dots for the thermal head is 240 dots, for example, four dots, i.e., a 237th dot, a 238th dot, a 239th dot and a 240th dot in the upper band, and a first dot, a second dot, a third dot and a fourth dot in the lower band are recorded so as to be superimposed on one another. Of these four dots, the dot (fourth dot) are distributed to the upper and lower bands with the 237th dot as a reference dot.

Further, in the present embodiment, dots lying within a superimposition recording range are respectively distributed to the upper and lower bands while dots lying in the scanning direction (raster direction) of the thermal head are being scanned.

A description will next be made of means for distributing the dots lying within such a superimposition recording range to the upper and lower bands with reference to FIGS. 2 through 19.

Figure 2:
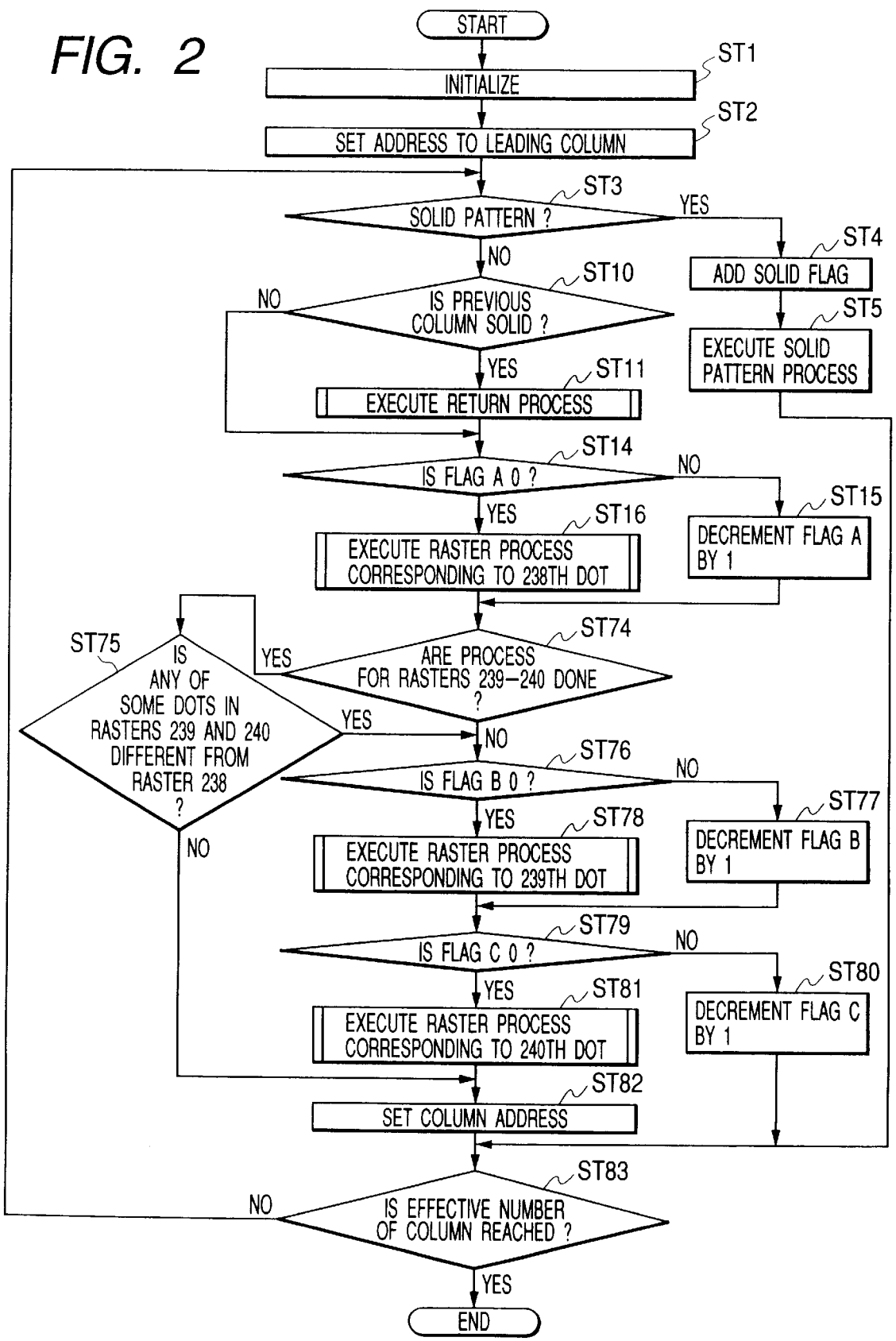
FIG. 2 is a flowchart illustrating a record data distributing process employed in the image recording method according to the present invention.

As shown in FIG. 2, for example, a memory for storing record data and other control circuits are first initialized (ST1). Thereafter, an address is set to each dot in the firstly-recorded most-end column (leading column) in the superimposition recording range (ST2).

It is thereafter determined based on the leading column whether the dots in the leading column show solid patterns (ST3). The solid patterns indicate patterns to be recorded with the maximum gradation or tone. When the dots in the column direction are all solid patterns, they are judged to be solid patterns.

Figure 3:
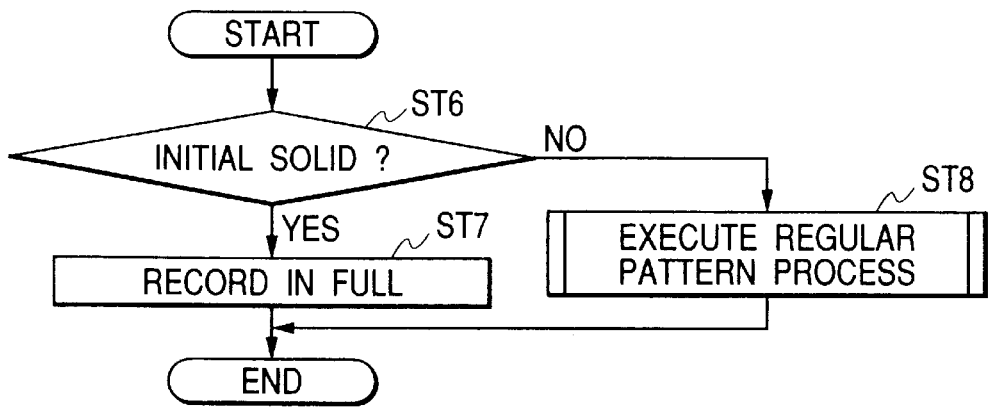
FIG. 3 is a flowchart depicting a solid pattern process shown in FIG. 2.
Figure 5:
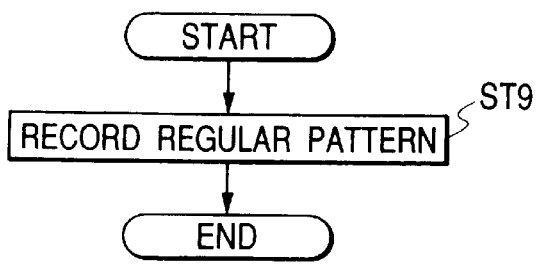
FIG. 5 is a flowchart illustrating a regular pattern process shown in FIG. 3.

If the dots in the column are judged to be the solid patterns, then a sold flag is added or offered (ST4) and a solid pattern process is executed (ST5). The solid pattern process is executed as shown in FIG. 3. Namely, it is determined whether the solid pattern is the initial or first solid pattern (ST6). If the solid pattern is judged to be the initial solid pattern, then the respective dots in the column direction are distributed to, for example, the upper band as dots recorded with the maximum tone (ST7). They may of course be distributed to the lower band. If the solid pattern is found not to be the initial solid pattern, then a regular pattern process is executed (ST8). The regular pattern process is done as shown in FIG. 5. Namely, for example, some of the respective dots in the column direction are thinned out to distribute only dots to be recorded to, for example, the upper band as dots to be recorded with the maximum tone (ST9).

Figure 4:
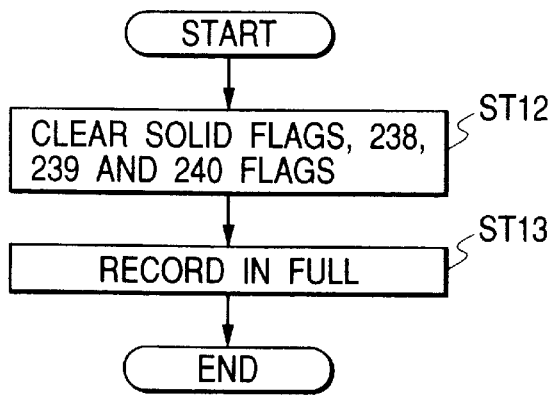
FIG. 4 is a flowchart showing a return process shown in FIG. 2.

If the dots in the column are found not to be the solid patterns as shown in FIG. 2, then a return to the immediately preceding column is made and it is determined whether dots in this column are solid patterns (ST10). If the dots in the immediately preceding column are found to be the solid patterns, then a return process is executed (ST11). This return process is carried out as shown in FIG. 4. Namely, a solid flag is cleared (ST12) and the respective dots in this column direction are distributed to, for example, an upper band as dots to be recorded with the maximum tone (ST13). That is to say, a range to be recorded by the solid patterns is set so that all dots are recorded in the first and last columns of the solid patterns and thinned-out dots are recorded in columns lying therebetween. This is because all the dots are recorded in the first and last columns of the solid patterns as described above so as not to avoid the lack of a side's stitching processing portion in a rectangular pattern or the like based on solid patterns, for example. Further, the reason why the thinned-out dots are recorded in the columns between the first and last columns, is that when one attempts to record all the dots lying therebetween, their recording becomes excessively dense, thus causing a so-called black-line.

If the dots in the column are found not to be the solid patterns, then a raster process is carried out from the 238th dot. At this time, it is examined whether a flag A is set to a raster corresponding to the 238th dot (ST14). If the flag A is found to be set thereto, i.e., if the flag A is found not to be 0, then the flag A is decremented by one without performing the raster process corresponding to the 238th dot (ST15). If the flag A is found to be 0, then the raster process corresponding to the 238th dot is executed (ST16).

Figure 6:
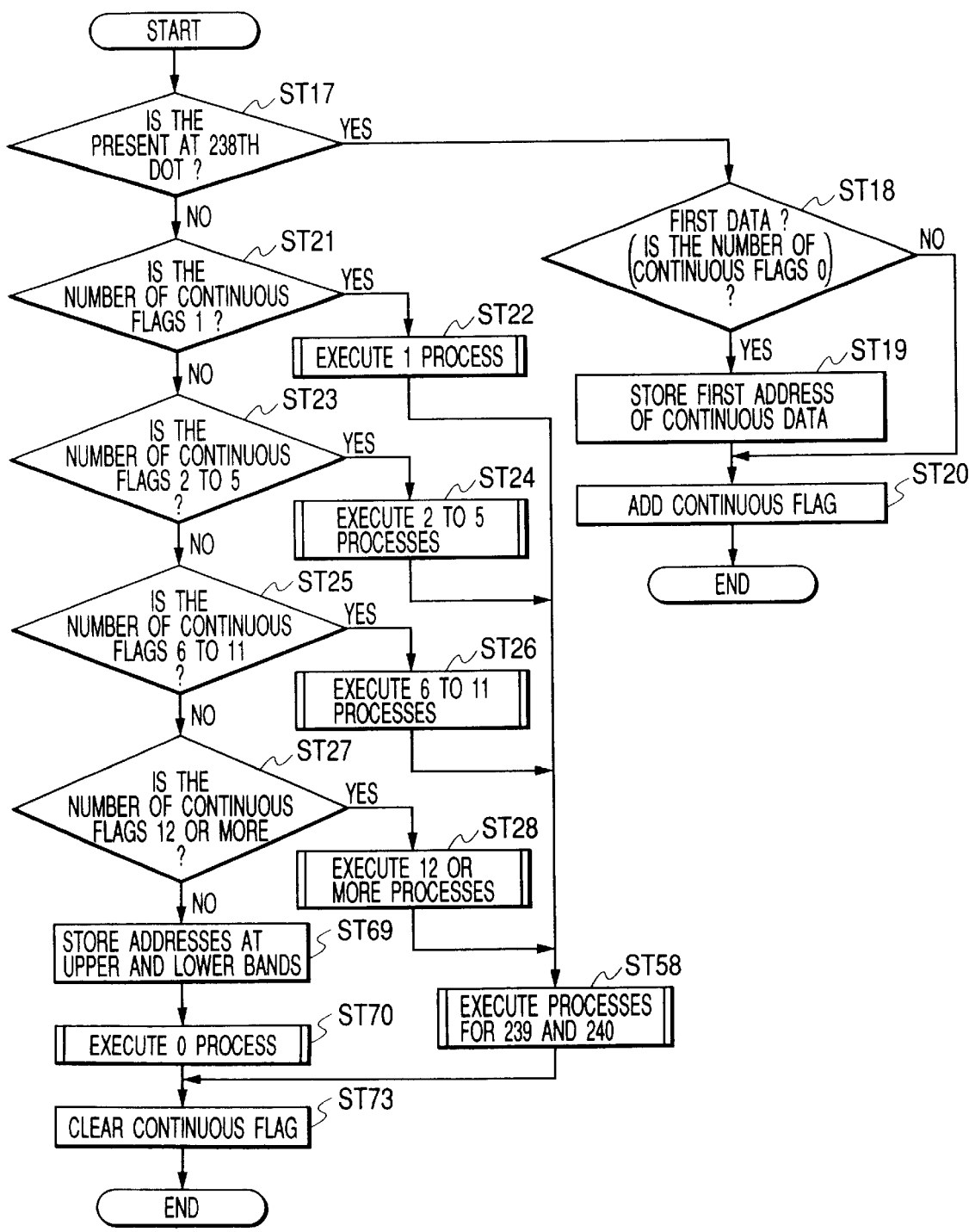
FIG. 6 is a flowchart depicting a raster process corresponding to a 238th dot shown in FIG. 2.

This raster process is done as shown in FIG. 6. Namely, a check is made as to whether record data exists in each dot in a column at the 238th dot (ST17). If the record data is found to exist, then a check is made as to whether the present record data is the initial or first record data (ST18). If the record data is found to be the first record data, then the first or initial address for continuous data with respect to the dot is stored (ST19) and a continuous flag is set or added (ST20). If the record data is found not to be the first record data, then the continuous flag is added or set (ST20).

If the record data is found not to exist in each dot in the column, then a process for examining the number of continuous flags used up to now, dividing the number of continuous flags into a plurality of groups according to the examined number of the continuous flags, and distributing the record data to upper and lower bands every these groups is executed. In the present embodiment, for example, one process is executed (ST22) when the number of the continuous flags is 1 (ST21), two to five processes are executed (ST24) when the number of the continuous flags is 2 to 5 (ST23), six to eleven processes are executed (ST26) when the number of the continuous flags is 6 to 11 (ST25), and twelve or more processes are executed (ST28) when the number of the continuous flags is 12 or more (ST27), respectively. Incidentally, the grouping according to the examined number of continuous flags may be done by any number of the continuous flags.

In the present embodiment, the one process aims to write the record data for each dot in the column into the upper band (ST29) and write 0 into the lower band (ST30) to thereby perform a record data distributing process as shown in FIG. 9. As a result, the record data are distributed as shown in FIG. 10. Here, "O" indicates the presence of the record data, whereas "X" indicates the absence of the record data.

The two to five processes are carried out as shown in FIG. 11. Namely, 0 is written into the upper band (ST31) as record data for each dot in the column at the initial address, of the dots each supplied with the continuous flag, and record data is written into the lower band (ST32). Next, addresses for columns at the upper and lower bands are both advanced by one (ST33 and ST34). Further, record data for dots in the following column is written into the upper band (ST35) and 0 is written into the lower band (ST36). Similarly, addresses for columns at the upper and lower bands are both advanced by one (ST33 and ST34). Further, record data for dots in the columns is written into the upper band (ST35) and 0 is written into the lower band (ST36). This process is repeatedly done by a number obtained by subtracting 1 from the number of continuous flags (ST37), whereby a record data distributing process is carried out. As a result, the respective record data are distributed as shown in FIG. 12.

Figure 13:
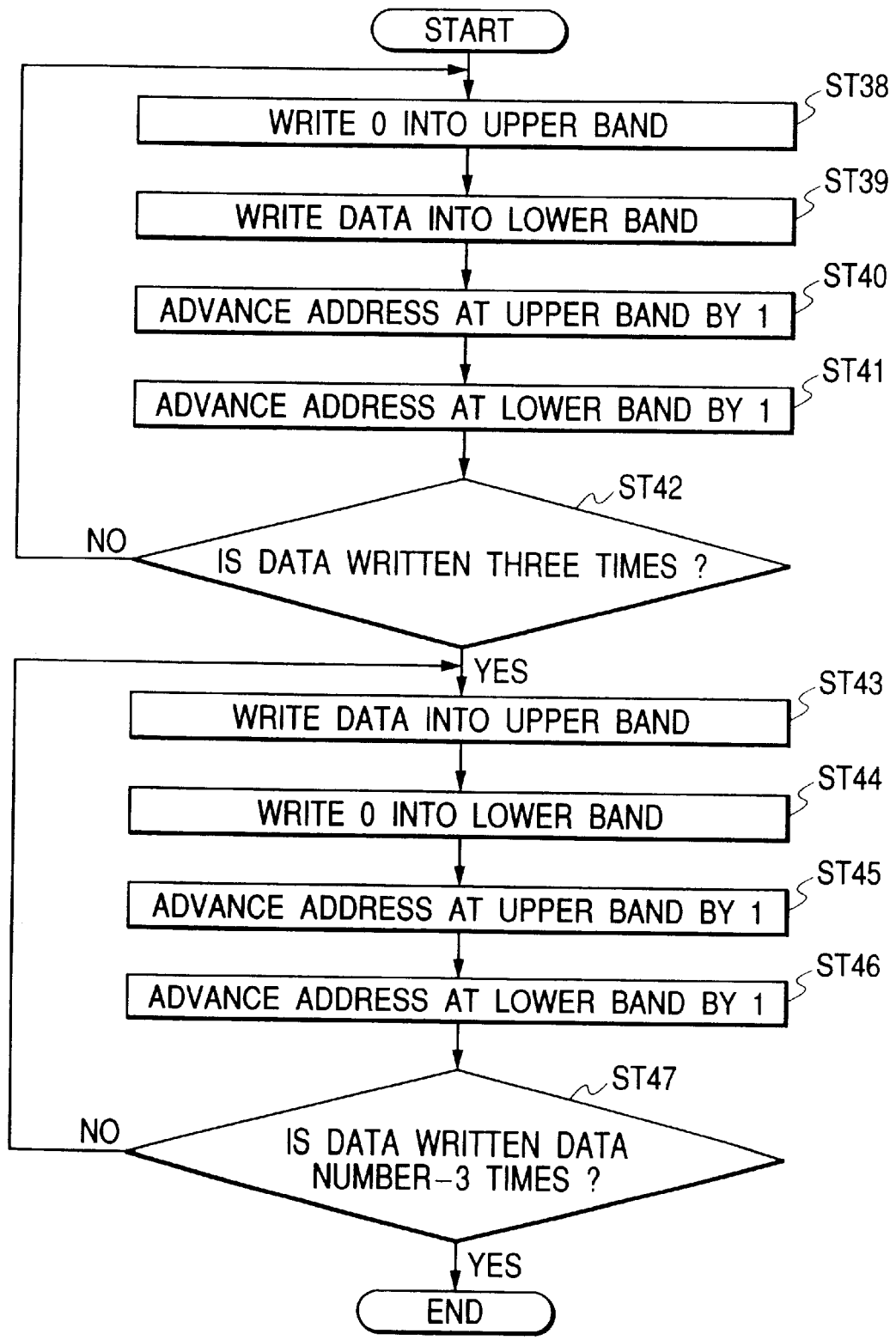
FIG. 13 is a flowchart showing six to eleven processes shown in FIG. 6.
Figure 14:
FIG. 14 is an explanatory view illustrating the result of distribution by the six to eleven processes shown in FIG. 6.

Further, the six to eleven processes are carried out as shown in FIG. 13. Namely, 0 is written into the upper band (ST38) as record data for each dot in the column at the initial address, of the dots each supplied with the continuous flag, and record data is written into the lower band (ST39). Next, addresses for columns at the upper and lower bands are both advanced by one (ST40 and ST41). Similarly, 0 is written into the upper band as record data for dots in the following column (ST38) and record data is written into the lower band (ST39). This process is repeated three times (ST42). When this process is repeated three times, record data for dots in the following column is written into the upper band (ST43) and 0 is written into the lower band (ST44). Next, addresses for columns at the upper and lower bands are both advanced by one (ST45 and ST46). Similarly, record data for dots in the next column is written into the upper band (ST43) and 0 is written into the lower band (ST44). This process is repeatedly done by a number obtained by subtracting 3 from the number of continuous flags (ST47), whereby a record data distributing process is carried out. As a result, the respective record data are distributed as shown in FIG. 14.

Figure 16:
FIG. 16 is an explanatory view showing the result of distribution by the twelve or more processes shown in FIG. 15.
Figure 15:
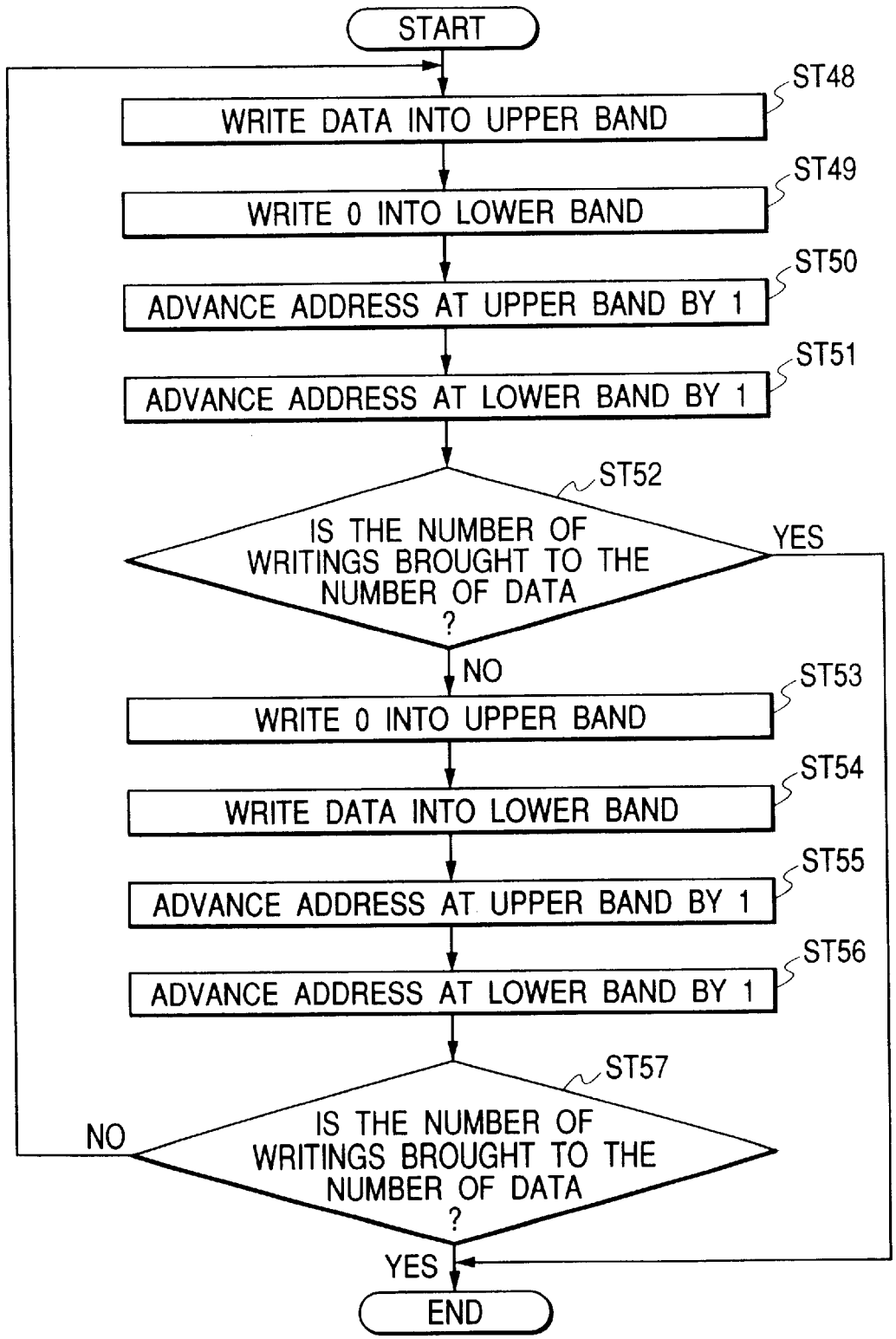
FIG. 15 is a flowchart depicting twelve or more processes shown in FIG. 6.
Figure 20:
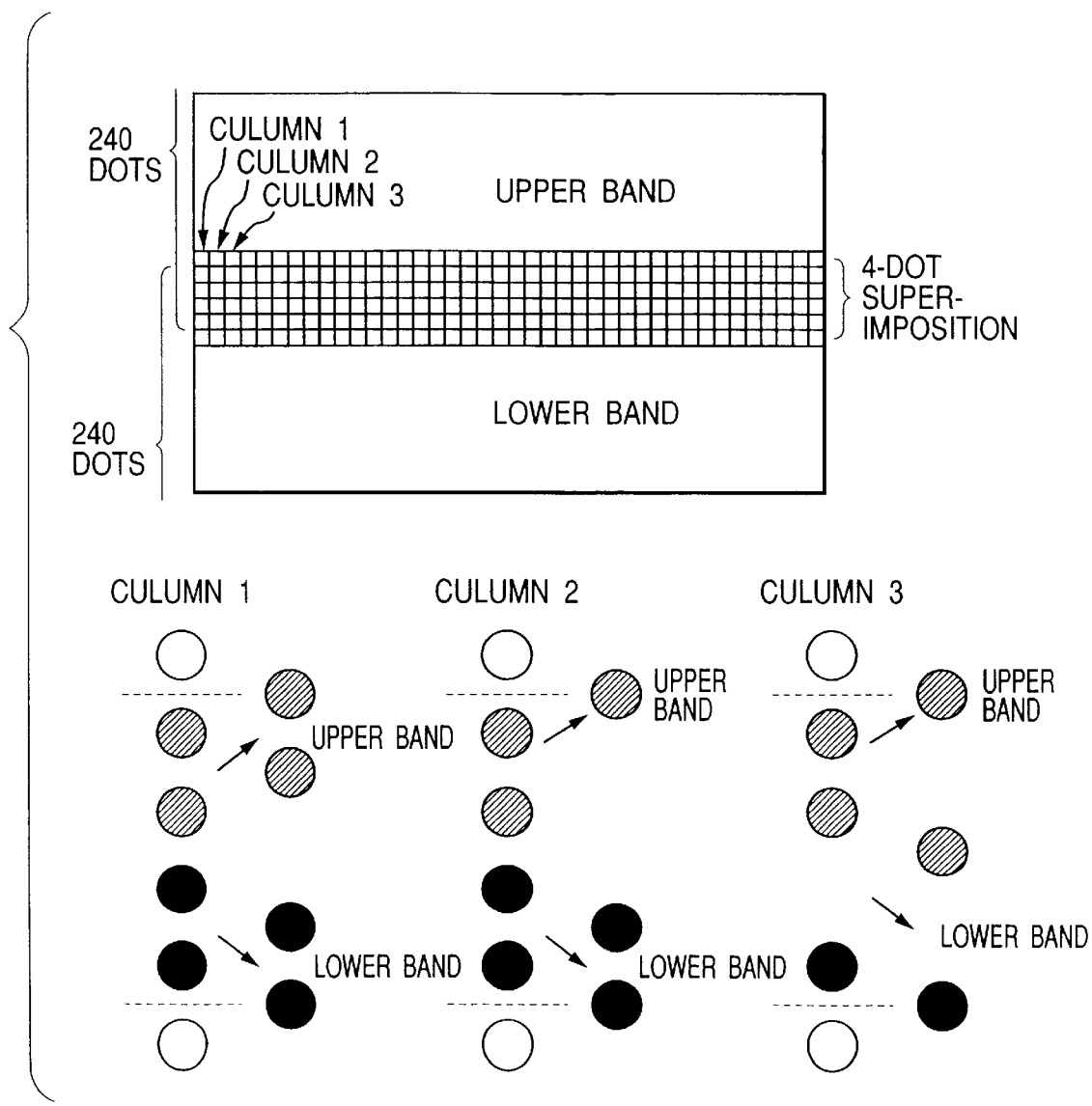
FIG. 20 is an explanatory view showing a conventional image recording method.

The twelve or more processes are performed as shown in FIG. 15. Namely, record data for each dot in the column at the initial address, of the dots each supplied with the continuous flag is written into the upper band (ST48), and 0 is written into the lower band (ST49). Next, addresses for columns at the upper and lower bands are both advanced by one (ST50 and ST51). It is determined whether the number of writings reaches the number of continuous flags (ST52). If the number of the writings is found to have reached the number of the continuous flags, then a distributing process is terminated. If the number of the writings is found not to have reached the number of the continuous flags, then 0 is written into the upper band as record data for dots in the following column (ST53). Further, record data is written into the lower band (ST54) and addresses for columns at the upper and lower bands are both advanced by one (ST55 and ST56). Similarly, it is judged whether the number of writings has reached the number of continuous flags (ST57). If it is found to have reached the number of the continuous flags, then a distributing process is finished. If it is found not to have reached the number of the continuous flags, then the above process is repeatedly performed by the number of the continuous flags, whereby a record data distributing process is carried out. As a result, the respective record data are distributed as shown in FIG. 16.

When a successive number of continuous flags in the raster direction at the 238th dot is determined and a process for distributing record data according to the respective groups is performed as shown in FIG. 6, a raster 239–240 process based on the regularity of a dither matrix is performed with record data for subsequently distribution-processed continuous flags as the reference (ST58).

Namely, the raster 239–240 process is carried out as shown in FIG. 17. A check is made as to record data for some dots in the raster direction at the 239th dot (ST59). It is judged whether the record data is identical to record data for dots in the raster direction at the 238th dot (ST60). If the record data is found to be identical to the record data for the dots in the raster direction at the 238th dot, then it is judged as the same successive number as the number of continuous flags in the raster direction at the 238th dot. Further, the same process as a distributing process thereof is performed without condition as the record data for continuous dots in the raster direction at the 239th dot. Namely, the distributed data is written into its corresponding memory (ST61).

Now, as some dots in the raster direction at the 239th dot, at least the final dot of the continuous dots set as the reference, and dots for the raster 239, which correspond to respective dots adjacent thereto and judged as having no record data, are selected in accordance with the regularity of the dither matrix for image formation. This is because their dot resolution is set so as to regularly increase as a pattern for the dither matrix.

Further, distribution processing data for the continuous dots in the raster direction at the 239th dot is written (ST61). Thereafter, a flag A is set to the raster 238 and a flag B is set to the raster 239 (ST62). These are those for avoiding wastage that the presence or absence of record data is judged later again with respect to the dots already subjected to the distributing process to thereby perform a distributing process. The flag A is a flag for avoiding the repetition of the raster process at the 238th dot. The flag B is a flag for avoiding the repetition of the raster process at the 239th dot. Each of these flags A and B is determined according to the regularity of the dither matrix in each raster direction. Thus, set values of these flags A and B differ from each other depending on the difference between the patterns for the dither matrixes.

When the examined record data is found not to be identical to the record data for the dots in the raster direction at the 238th dot as a result of the examination of some dots in the raster direction at the 239th dot (ST59 and ST60), the processing of the normal continuous flag shown in the raster process at the 238th dot referred to above is performed.

Even in the case of dots in the raster direction at the 240th dot, record data for some dots in the raster direction at the 240th dot is next examined in accordance with the regularity of the dither matrix in a manner similar to the raster corresponding to the 239th dot as shown in FIG. 17 (ST63). It is judged whether the examined record data is the same record data as the record data for the dots in the raster direction at the 238th dot (ST64) . If it is found to be identical thereto, then distribution processing data is written into its corresponding memory at the 240th dot so that the same distributing process as the continuous flag in the raster direction at the 238th dot is performed without condition (ST65).

Further, a flag A is set to the raster 238 and a flag C is set to the raster 240 (ST66). These flags A and C are also those for avoiding wastage of the repetition of the raster process in a manner similar to the set values of the flags referred to above. The flag C is one for avoiding the repetition of the raster process at the a 240th dot.

If the record data for some dots in the raster direction at the 240th dot is not identical to the record data for the dots in the raster direction at the 238th dot, then the normal continuous flag is executed without writing the data for distribution processing executed in the raster direction at the 238th dot.

The respective partial dots in the rasters 239 and 240 are next examined. Thereafter, it is determined whether it is necessary to correct or modify the already-set flags A, B and C (ST67). Namely, it is judged whether any of the record data for the continuous dots in the rasters 239 and 240 is identical to the record data for the continuous dot in the raster 238 (ST67) . If any of the record data is found to be identical, then the values of the already-set flags A, B and C are temporarily cleared and the flags B and C are set (ST68). Thus, when an address is caused to proceed to the next leading column in accordance with the dither patterns for the raster 238 to thereby perform the following raster process, the dots at the column positions in the rasters 239 and 240 already subjected to the distribution processing are avoided from the execution of repetitive raster processing.

Figure 18:
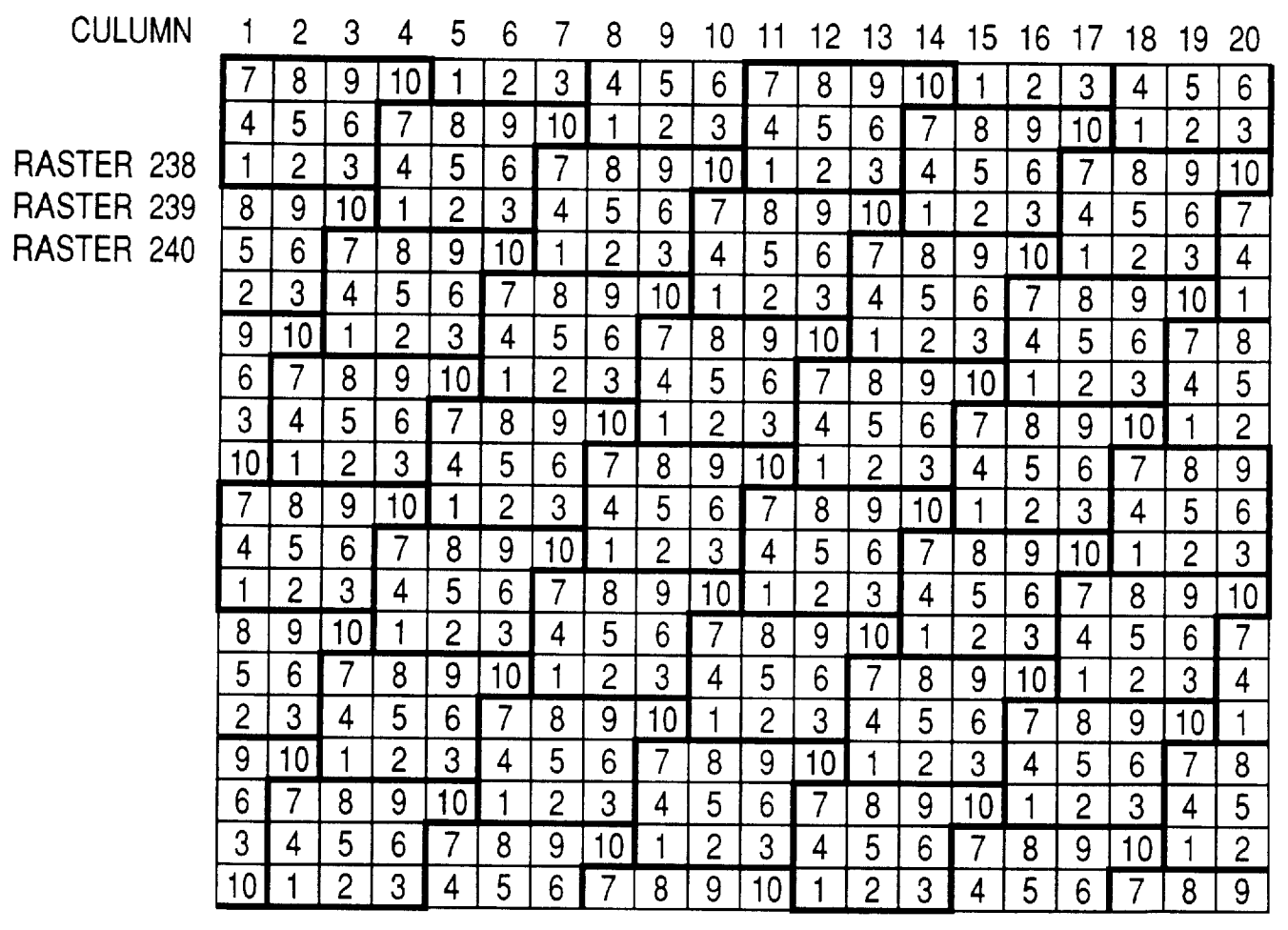

The raster 239–240 process will further be described more specifically with reference to FIG. 18. Now consider where, for example, a dither matrix corresponding to one pixel of image information is defined as a (3×3+1) pattern and a screen angle is set minus to thereby perform distribution processing. In this case, if the successive number of continuous flags in a raster direction at a 238th dot is regarded as 7, then the presence or absence of record data for dots in respective raster directions is determined in order from a column 1. When the address proceeds up to a column 8, a successive number 7 of continuous flags in the raster 238 is determined and a process for distributing the successive number 7 is executed (ST26) . As dots corresponding to the final dot in the continuous flag for the raster 238 already subjected to the distribution processing and dots adjacent thereto and judged as having no record data, dots for columns 10 and 11 corresponding to dither resolutions Nos. 7 and 8 in the raster 239 are examined (ST59).

If, at this time, record data exists in the column 10 and no record data exists in the column 11, then the successive number of continuous flags in the raster 239 is judged as identical to the successive number of continuous flags in the raster 238 (ST60), and seven-process distribution data in the raster 238 are written into the corresponding memory without condition as they are (ST61). Further, 4 is set to the flag A and 7 is set to the flag B (ST62).

As judged according to the regularity of the dither matrix, 4 corresponding to the number of columns from the leading position (column 7) of a dither pattern for the raster 240 to the leading position (column 11) of the next dither pattern for the raster 238 is set to the flag A.

Further, as judged according to the regularity of the dither matrix, 7 corresponding to the number of columns from the leading position (column 7) of the dither pattern for the raster 240 to the leading position (column 14) of the next dither pattern for the raster 239 is set to the flag B. The values of the flags A and B set herein are set assuming that the record data (successive number) for the continuous flag in the raster 240 is different from the record data (successive number) for the continuous flag in the raster 238. Even when the normal raster process is effected on the raster 240, the procedures in the rasters 238 and 239 proceed to such a routine that raster processing is not repeatedly effected on the already-processed dots.

Furthermore, the identity of record data for a continuous flag in the raster 240 with the record data for the continuous flag in the raster 238 is determined similarly even in the case of the raster 240. Namely, dots for columns 13 and 14 corresponding to dither resolutions Nos. 7 and 8 in the raster 240 are examined (ST63). If record data exists in the column 13 and no record data exists in the column 14, then the record data for the continuous flag in the raster 240 is judged as identical to the record data for the continuous flag in the raster 238 (ST64), and the seven-process distribution data in the raster 238 are written without condition as they are (ST65). Further, 7 is set to the flag B and 13 is set to the flag B (ST62).

As judged according to the regularity of the dither matrix, 7 corresponding to the number of columns from the leading position (column 4) of a dither pattern for the raster 239 to the leading position (column 11) of the next dither pattern for the raster 238 is set to the flag A.

Further, as judged according to the regularity of the dither matrix, 13 corresponding to the number of columns from the leading position (column 4) of the dither pattern for the raster 239 to the leading position (column 17) of the next dither pattern for the raster 240 is set to the flag C. The values of the flags A and C set herein are set assuming that the record data for the continuous flag in the raster 239 is different from the record data for the continuous flag in the raster 238. Even when the normal raster process is effected on the raster 239, the procedures in the rasters 238 and 240 proceed to such a routine that raster processing is not repeatedly effected on the already-processed dots.

The respective partial dots in the rasters 239 and 240 are next examined. Thereafter, it is determined whether it is necessary to correct or modify the set flags A, B and C (ST67). Namely, it is judged whether any of the record data for the continuous flags in the rasters 239 and 240 is identical to the record data for the continuous dot in the raster 238 (ST67). If any of the record data is found to be identical, then the values of the already-set flags A, B and C are cleared, and 3 is set to the flag B and 6 is set to the flag C (ST68). As the set value of the flag B at this time, 3 corresponding to the number of columns from a column (column 11) at the next leading position in the raster 238 to a column (column 14) at the next leading position in the raster 239 is set to the flag B according to the regularity of the dither matrix. Further, as the set value of the flag C, 6 corresponding to the number of columns from the column (column 11) at the next leading position in the raster 238 to a column (column 17) at the next leading position in the raster 240 is set to the flag C according to the regularity of the dither matrix.

Thus, when the column proceeds to the next leading column (column 11) in accordance with the dither patterns for the raster 238, repetitive raster processing of dots in the rasters 239 and 240 already subjected to the distribution processing can be avoided.

Such a raster 239–240 process is carried out based on the case where record data between dots adjacent in upward and downward directions as to image information often coincide with one another. A processing speed can be made fast by the possible omission of raster processing.

On the other hand, when no record data exists in each dot in the column and the number of continuous flags does not correspond to 1 to 12 or more, i.e., when the number of the continuous flags is 0 as shown in FIG. 6, addresses at upper and lower bands are respectively stored (ST69) and a 0 process is executed (ST70). As to the 0 process, as shown in FIG. 7, 0 is written into the upper band as the record data for the dots in the column (ST71). Further, 0 is written into the lower band (ST72) Thus, the respective record data are portioned out or distributed as shown in FIG. 8.

Further, when the respective processes are completed, the continuous flag is cleared (ST73) and the raster process corresponding to the 238th dot is finished.

After the completion of the distribution of the record data at the 238th dot in this way, a distributing process is effected even on the 239th dot. In this case, it is firstly determined whether a raster 239–240 process is done as shown in FIG. 2 (ST74). If it is determined that the raster 239–240 process has been done, then a decision is further made as to whether any of record data for respective continuous dots in the rasters 239 and 240 is different from the record data for the continuous flag in the raster 238 as a result of the execution of the raster 239–240 process (ST75). If it is found to be identical, namely, when the record data in one or both of the rasters 239 and 240 are found to be identical to the record data for the continuous flag in the raster 238, an address for a new column is set (ST82).

Described specifically, when any of the record data for the continuous flags in the rasters 239 and 240 is identical to that for the continuous flag in the raster 238, an address for each column is set to a column at the next leading position in the raster 238 in accordance with the regularity of a dither matrix. If described with reference to FIG. 18 by way of example, then an address is set to the column 11.

When only the record data for the continuous flag in the raster 239 is identical to the continuous flag in the raster 238 and the record data for the continuous flag in the raster 240 is different therefrom, the normal raster process for determining the presence or absence of record data for each dot with respect to the raster 240 is carried out. Therefore, a column's address is set to the leading position in the raster 240 in accordance with the regularity of the dither matrix. If described with reference to FIG. 18 by way of example, then an address is set to the column 7.

Further, when only the record data for the continuous flag in the raster 240 is identical to the continuous flag in the raster 238 and the record data for the continuous flag in the raster 23 is different therefrom, the normal raster process for determining the presence or absence of record data for each dot with respect to the raster 239 is carried out. Therefore, a column's address is set to the leading position in the raster 239 in accordance with the regularity of the dither matrix. If described with reference to FIG. 19 by way of example, then an address is set to a column 4.

On the other hand, when the raster 239–240 process is not done upon the raster process at the 238th dot and when any of the record data for the continuous flags in the rasters 239 and 240 is different from the record data for the continuous flag in the raster 238 although the raster 239–240 process is executed, it is judged whether a flag B is 0 (ST76). If the flag B is set and found not to be 0, then the flag B is decremented by 1 (ST77). If the flag B is not set and found to be 0, then a raster process corresponding to the 239th dot is executed (ST78). As to the raster process in this case, a process in a state in which the raster 239–240 process (ST58) is omitted from the raster process corresponding to the 238th dot shown in FIG. 6, is carried out as the raster process corresponding to the 239th dot.

Similarly even in the case of a raster process corresponding to the 240th dot, a decision is made as to whether a flag C is 0 (ST79). If the flag C is set and found not to be 0, then the flag C is decremented by 1 (ST80). If the flag C is not set and found to be 0, then the raster process corresponding to the 240th dot is performed (ST81). Similarly even in the raster process in this case, the process in the state in which the raster 239–240 process (ST58) is eliminated from the raster process corresponding to the 238th dot shown in FIG. 6 is carried out as the raster process corresponding to the 240th dot.

Thereafter, the address is shifted to the next column (ST82). It is determined whether the distribution of record data to all the columns is done (ST83). If it is determined that the distribution thereof has been performed, then the distributing process is completed. If the distribution thereof is found not to be done, then the distributing process is repeatedly performed until the distribution of the record data to all the columns is completed.

Figure 19:
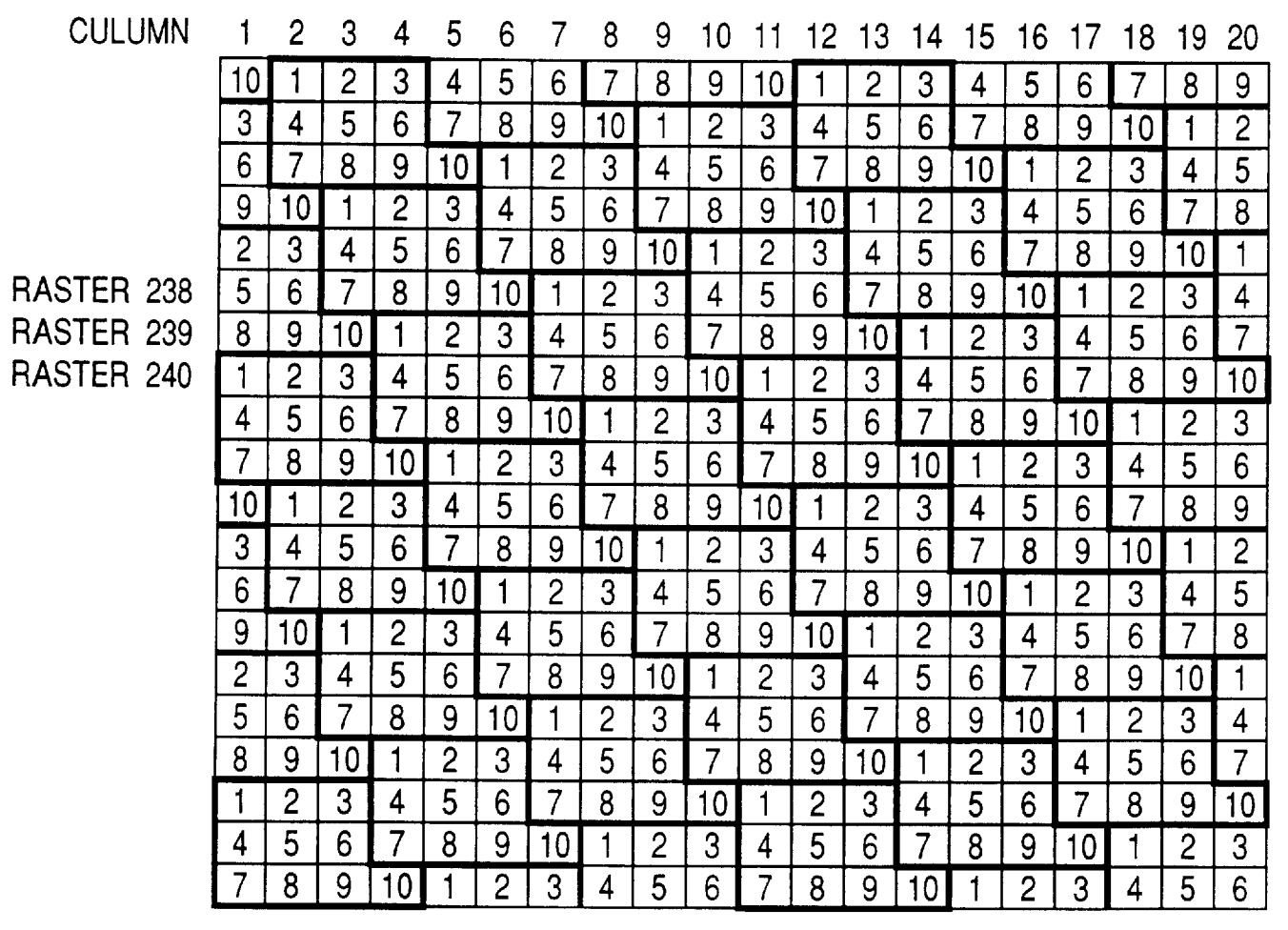

Incidentally, the present embodiment referred to above has shown, as an illustrative example, the case in which when the screen angle of the dither matrix is minus, image information is recorded by color ink of cyan, for example. Therefore, the distributing process is first effected on the record data for the continuous dots in the raster corresponding to the 238th dot in the superimposition recording range. Further, the record data is compared with the record data for the respective continuous dots in the raster corresponding to the 239th dot and the raster corresponding to the 240th dot, whereby the "raster 239–240 process" is carried out. However, if data recording is done based on image information through the use of color ink of magenta, for example where the screen angle of the dither matrix is plus as shown in FIG. 19, then a distributing process is first effected on the record data for the continuous dots in the raster corresponding to the 240th dot in the superimposition recording range. Further, the record data for the respective continuous dots in the raster corresponding to the 239th dot and the raster corresponding to the 238th dot are compared with the above record data as the reference, whereby a "raster 239–238" process may be carried out.

When it is desired to perform the distribution of record data in the superimposition recording range with respect to image information based on color ink of yellow, the record data at either the 238th dot or the 240th dot may be set as the reference. This is because no screen angle is provided in each dither pattern, i.e., the screen angle is set to 0° or 90°. Incidentally, the color ink of yellow might not be used for superimposition recording in the superimposition recording range on the ground that the color ink of yellow is made unprominent.

While the process for distributing the record data at the 238th dot has been described in detail in the above-described embodiment, such record data distribution is not limited to one according to the present embodiment. Record data can arbitrarily be distributed to the upper and lower bands respectively.

Owing to such a process, desired recording can be carried out by activating the thermal head based on the distribution of the record data.

In the above-described embodiment, since the record of the thermal head by the upper band and the record of the thermal head by the lower band overlap each other when the record data are respectively written into the upper and lower bands for each dot, a dense record might be produced. In such a case, however, at least one of the record by the upper band and the record by the lower band may be performed with less tone.

Thus, in the present embodiment, the process for adding or offering the continuous flag to each dot lying in the raster direction when the record data exists in each dot, and distributing the record data for the continuous dots supplied with the continuous flags to the upper and lower bands respectively only when no record data exists in each dot, is carried out. Therefore, the record data distributing process is simplified in the way of performing its process, throughput or the quantity of data to be processed can be greatly reduced, and processing can promptly be performed as compared with the case where the process for distributing each individual record data for each column is executed as in the prior art. Thus, the time required to perform the distributing process results in about ½ as compared with the prior art, thus making it possible to make a recording speed faster. Changing the diameter of each recording dot makes it possible to sufficiently cope with the execution of multitonal recording.

Further, in the present embodiment, when it is desired to perform a process for distributing record data for dots in a given raster direction, record data for some dots in another raster direction are examined on the basis of record data for continuous dots in the direction of a raster already subjected to a distributing process. When the dots indicative of the examined record data are identical to the dots in the raster direction set as the reference, the same distributing process as a process for distributing the continuous dots in the raster direction set as the reference is effected on the record data for the continuous dots in another raster direction without condition. It is thus possible to reduce throughput much more and perform processing easily and promptly.

Incidentally, the present invention is not limited to the above-described embodiment. Changes can be made thereto as needed.

As described above, an image recording method according to the invention of the present application executes a process for adding a continuous flag to each of dots lying in a scanning direction of a thermal head when record data exists in the dot and distributing record data for continuous dots supplied with the continuous flags to upper and lower bands only when no record data exists therein. Therefore, a record data distributing process is simplified in the way of performing its process, throughput or the quantity of data to be processed can be greatly reduced, and processing can be performed easily and promptly as compared with the case where the record data distributing processes are executed for each column as in the prior art.

Further, record data for some dots in another raster direction are examined on the basis of record data for continuous dots in the direction of a raster already subjected to a distributing process. Thus, when each examined record data is identical to the record data for the dots in the raster direction set as the reference, the same distributing process as a process for distributing the continuous dots set as the reference is effected on the record data for the continuous dots in another raster direction without condition. It is therefore possible to reduce the quantity of record data to be subjected to a distributing process much more and perform an easy and prompt process.

In the invention of the present application as well, a distributing process can be further effected on continuous dots in a raster direction set as the reference by simply examining record data for minimum dots in another raster direction, thus making it possible to reduce the quality of record data to be processed.

Further, in the invention of the present application, a proper and prompt distributing process can be done according to the direction of a screen angle of a dither matrix.

Furthermore, in the invention of the present application, distributing processes are respectively effected on record data corresponding to respective colors of cyan, magenta and yellow, thereby making it possible to properly record a full-color image by the three colors of cyan, magenta and yellow.

The invention of the present application can bring about an effect in that, for example, a monochrome image can be recorded properly by effecting a distributing process on monochrome record data.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. An image recording method for recording an upper band corresponding to a range recorded by one scanning of a thermal head and a lower band corresponding to a range recorded by a next scanning of the thermal head in superimposed form by a plurality of dots, distributing record data corresponding to the plurality of dots in the superimposed recording range to the upper and lower bands respectively, and activating respective heating elements of the thermal head based on the distributed record data to thereby record an image, comprising:

executing a process to successively examine dots in a raster direction corresponding to a scanning direction of the thermal head, adding continuous flags to the dots when record data exist in the dots, and distributing record data for continuous dots supplied with the continuous flags to the upper and lower bands when the record data do not exist therein; and examining record data for some dots in another raster direction on the basis of record data for continuous dots in the raster direction, which are already subjected to a distributing process, and effecting the same distributing process as a process to distribute the continuous dots in the raster direction set as a reference on record data for the continuous dots in said another raster direction without condition when the examined record data are identical to the record data for the dots in the raster direction set as the reference.

2. The image recording method according to claim 1, wherein some dots examined in said another raster direction with respect to the raster direction set as the reference are set as dots respectively corresponding to at least a final dot of the continuous dots set as the reference and dots adjacent thereto and judged as having no record data, which are determined in accordance with the regularity of a dither matrix for image information.

3. The image recording method according to claim 1, wherein the raster direction set as the reference, of the respective raster directions in the superimposed recording range is determined in consideration of whether a screen angle of the dither matrix is placed in a positive or negative direction, based on image information.

4. The image recording method according to claim 1, wherein distributing processes are respectively effected on record data of respective colors, based on image information color-separated into at least three colors of cyan, magenta and yellow to thereby perform full-color recording.

5. The image recording method according to claim 1, wherein a distributing process is effected on record data for monochrome image information to thereby perform monochrome recording.

* * * * *